(12) United States Patent
Priyantha et al.

(10) Patent No.: US 8,706,172 B2
(45) Date of Patent: Apr. 22, 2014

(54) ENERGY EFFICIENT CONTINUOUS SENSING FOR COMMUNICATIONS DEVICES

(75) Inventors: Nissanka Arachchige Bodhi Priyantha, Redmond, WA (US); Jie Liu, Medina, WA (US); Dimitrios Lymperopoulos, Bellevue, WA (US)

(73) Assignee: Miscrosoft Corporation, Redmond, WA (US)

( * ) Notice: Subject to any disclaimer, the term of this patent is extended or adjusted under 35 U.S.C. 154(b) by 120 days.

(21) Appl. No.: 12/912,456

(22) Filed: Oct. 26, 2010

(65) Prior Publication Data

US 2012/0100895 A1 Apr. 26, 2012

(51) Int. Cl.
*H04M 1/00* (2006.01)
*G06F 1/00* (2006.01)

(52) U.S. Cl.
USPC ............................ 455/574; 713/300; 713/323

(58) Field of Classification Search
USPC ............. 455/343.1, 343.2, 343.4, 574, 127.5, 455/234.1, 522, 456.3, 69, 78; 270/241, 270/254; 713/100, 332, 323, 1; 715/300
See application file for complete search history.

(56) References Cited

U.S. PATENT DOCUMENTS

| | | | |
|---|---|---|---|
| 6,847,892 B2 | 1/2005 | Zhou et al. | |
| 7,408,506 B2 | 8/2008 | Miller | |
| 2006/0271797 A1* | 11/2006 | Ginggen et al. | 713/300 |
| 2007/0067655 A1* | 3/2007 | Shuster | 713/300 |
| 2007/0218938 A1* | 9/2007 | Carter | 455/528 |
| 2008/0111698 A1 | 5/2008 | Atherton | |
| 2010/0074450 A1* | 3/2010 | Liao | 381/57 |
| 2010/0302028 A1* | 12/2010 | Desai et al. | 340/539.3 |
| 2010/0313050 A1* | 12/2010 | Harrat et al. | 713/323 |
| 2011/0215952 A1* | 9/2011 | Aria et al. | 341/20 |
| 2011/0254792 A1* | 10/2011 | Waters et al. | 345/173 |

OTHER PUBLICATIONS

Kang, et al., "A Scalable and Energy-Efficient Context Monitoring Framework for Mobile Personal Sensor Networks", IEEE Transactions on Mobile Computing, vol. 9, No. 5, May 2010, pp. 686-702.
Shin, et al., "Deamon: Energy-efficient sensor monitoring", 6th Annual IEEE Communications Society Conference on Sensor, Mesh and Ad Hoc Communications and Networks, Jun. 22-26, 2009, pp. 9.

(Continued)

*Primary Examiner* — Andrew Wendell
*Assistant Examiner* — Cindy Trandai
(74) *Attorney, Agent, or Firm* — Steve Wight; Carole Boelitz; Micky Minhas

(57) ABSTRACT

A "Communication Device with Energy Efficient Sensing" provides various techniques for enabling a variety of sensor-based applications and processes while conserving energy on mobile communications devices. More specifically, the Communication Device with Energy Efficient Sensing provides a novel sensing architecture for mobile communications devices where sampling and, in various embodiments, processing, of sensor data received from one or more sensors is offloaded to a dedicated low-power processor having the capability to interact with a primary processor of the communications device. Such sensors include, but are not limited to accelerometers, ambient light sensors, compasses, microphones, pressure sensors, touch sensors, low-power radio devices, etc. This approach enables the communications device to perform continuous sensing with a low power overhead. In various tested embodiments, it has been observed that that the sensing architecture described herein can be two to three orders of magnitude more energy efficient in comparison to conventional communications devices.

20 Claims, 4 Drawing Sheets

"Communication Device with Energy Efficient Sensing" with Low-Power Processor Integrated into Primary Phone Processor using Shared Memory

(56) References Cited

OTHER PUBLICATIONS

Zhenyun, et al., "Improving Energy Efficiency of Location Sensing on Smartphones", Proceedings of the 8th international conference on Mobile systems, applications, and services, Jun. 15-18, 2010, pp. 315-329.

Abdesslem, et al., "Less is More: Energy-Efficient Mobile Sensing with SenseLess", MobiHeld an ACM SIGCOMM workshop, Aug. 17, 2009, pp. 61-62.

Abdelzaher, et al., "Mobiscopes for Human Spaces", IEEE Pervasive Computing, vol. 6, No. 2, Apr.-Jun. 2007, pp. 11.

Agrawal, et al., "Somniloquy: Augmenting Network Interfaces to Reduce PC Energy Usage", Proceedings of the 6th USENIX symposium on Networked systems design and implementation, 2009, pp. 16.

Barroso, et al., "The Case for Energy-Proportional Computing", IEEE Computer Society, vol. 40, No. 12, Dec. 2007, pp. 33-37.

Hoh, et al., "Virtual Trip Lines for Distributed Privacy-Preserving Traffic Monitoring", Proceedings of the 6th International Conference on Mobile Systems, Applications, and Services, Jun. 17-20, 2008, pp. 14.

Burke, et al., "Participatory Sensing", WSW at SenSys, Oct. 31, 2006, pp. 5.

Chiu, et al., "Playful Bottle: A Mobile Social Persuasion System to Motivate Healthy Water Intake", Proceedings of the 11th international conference on Ubiquitous computing, Sep. 30-Oct. 3, 2009, pp. 10.

Consolvo, et al., "Flowers or a Robot Army?: Encouraging Awareness & Activity with Personal, Mobile Displays", Proceedings of the 10th international conference on Ubiquitous computing, vol. 12, No. 4, Publisher: ACM Press, Sep. 21-24, 2008, pp. 10.

Foster, et al., "Precision and accuracy of an ankle-worn accelerometer-based pedometer in step counting and energy expenditure. Preventive Medicine", Preventive Medicine, vol. 41, No. 3-4, Sep.-Oct. 2005, pp. 778-783.

Hull, et al., "CarTel: A Distributed Mobile Sensor Computing System", Proceedings of the 4th international conference on Embedded networked sensor systems, Nov. 1-3, 2006, pp. 14.

Lester, et al., "A Practical Approach to Recognizing Physical Activities", Pervasive Computing in Pervasive Computing, vol. 3968, 2006, pp. 17.

Lu, et al., "Sound Sense: Scalable Sound Sensing for People-Centric Sensing Applications on Mobile Phones", Proceedings of the 7th international conference on Mobile systems, applications, and services, Jun. 22-25, 2009, pp. 14.

Mohan, et al., "Nericell: Rich Monitoring of Road and Traffic Conditions using Mobile Smartphones", Proceedings of the 6th ACM conference on Embedded network sensor systems, Nov. 5-7, 2008, pp. 14.

Oliver, et al., "Health Gear: A Real-Time Wearable System for Monitoring and Analyzing Physiological Signals", Apr. 2006, pp. 1-4.

Pering, et al., "The PSI Board: Realizing a Phone-Centric Body Sensor Network", In 4th International Workshop on Wearable and Implantable Body Sensor Networks, 2007, pp. 6.

Riva, et al., "The Urbanet Revolution: Sensor Power to the People!", IEEE Pervasive Computing, vol. 6, No. 2, Apr. 2007, pp. 41-49.

Woodman, et al., "Pedestrian Localisation for Indoor Environments", Proceedings of the 10th international conference on Ubiquitous computing, Sep. 21-24, 2008, pp. 10.

Yu, et al., "Personalized Awareness and Safety with Mobile Phones as Sources and Sinks", Proceedings of Urbansense, workshop held in conjunction with SenSys, Nov. 4, 2008, pp. 26-30.

Lester, et al., "Validated Caloric Expenditure Estimation using a Single Body-Worn Sensor", Proceedings of the 11th international conference on Ubiquitous computing, Sep. 30-Oct. 3, 2009, pp. 10.

Lin, et al., "Energy-Accuracy Trade-Off for Continuous Mobile Device Location", Proceedings of the 8th international conference on Mobile systems, applications, and services, Jun. 15-18, 2010, pp. 13.

Paek, et al., "Energy-Efficient Rate-Adaptive GPS-Based Positioning for Smartphones", Proceedings of the 8th international conference on Mobile systems, applications, and services, Jun. 15-18, 2010, pp. 16.

Wang, et al., "A Framework of Energy Efficient Mobile Sensing for Automatic User State Recognition", Proceedings of the 7th international conference on Mobile systems, applications, and services, Jun. 22-25, 2009, pp. 14.

Zhuang, et al., "Improving Energy Efficiency of Location Sensing on Smartphones", Proceedings of the 8th international conference on Mobile systems, applications, and services, Jun. 15-18, 2010, pp. 15.

\* cited by examiner

"Communication Device with Energy Efficient Sensing" with Low-Power Processor Integrated into Microcontroller in the Primary Phone Processor using Integral Memory "Communication Device with Energy Efficient Sensing" with Low-Power Processor Integrated into Primary Phone Processor using Shared Memory

ENERGY EFFICIENT CONTINUOUS SENSING FOR COMMUNICATIONS DEVICES

BACKGROUND

1. Technical Field

A "Communication Device with Energy Efficient Sensing" provides various hardware and software-based techniques for reducing energy usage of communications devices while enabling continuous operation of various sensors and components of the communications device.

2. Background

Users typically carry their mobile phones, smart phones, handheld communications devices, etc., to almost every activity they engage in during the course of the day. Note that such devices are collectively referred to herein as "mobile phones" or "communications devices" for purposes of discussion. Even though most people carry their mobile phones throughout the day, these devices are generally actively in use for only a small amount of time for making phone calls, web browsing, entertainment, etc.

The ubiquity, mobility, and connectivity of mobile communications devices have made them an ideal platform for developing numerous personalized applications, which is evident from the large number of apps available for various mobile platforms. Apart from having a reasonably powerful processor and graphics capability for supporting rich applications, current high-end communications devices often include some or all of a rich set of built-in sensors that enable measuring various phenomena on and around the communications devices and thus on and around their owners. Applications on mobile phones can either use the sensors on-demand or continuously (or in some combination of these two cases, depending upon the phone, sensors, and applications).

For example, in the case of on-demand operations, sensor reading operations are typically initiated by the processor of the mobile phone when a program or application in the foreground needs to access context information relating to the sensor. A simple example of this idea is that, when a query is sent, a search application can read a GPS sensor in the phone to get the user's current location. However, limiting sensor access to the times when the phone has the user's attention (i.e., times other than when the phone is "off" or in a standby or sleep mode) greatly restricts sensor information that could otherwise be of significant value for a variety of purposes and applications.

Applications requiring continuous sampling of sensors associated with a communications device or mobile are also becoming ubiquitous. For example, one such application that reacts to sudden changes in the user behavior, such as user tapping on the phone (e.g., to initiate a command, respond to a prompt, etc.), requires continuous sensing to detect the user tapping activity. Unfortunately, such continuous sensing is quite challenging from an energy expenditure perspective under the current architecture of typical communications devices, since these types of continuous sensing activities typically have a significant impact on the device's battery life.

In particular, designed mainly for bursts of user interactions, current mobile phones and communications devices generally use a primary processor or CPU to directly interface with and control the various sensors of the device. Consequently, continuous sensing by such devices implies that the main or primary processor has to stay on all the time. These processors typically consume hundreds of milli-Watts (mW) when they are active even when the screen and radios are turned off. Unfortunately, this energy usage significantly limits the battery life, thereby jeopardizing the usability of the phone. Thus energy consumption concerns have become a significant barrier for continuous sensing applications.

For example, the current draw of a typical smart phone under different operating conditions when using an integrated accelerometer can be quite substantial. Energy expenditure measurements of a conventional smart phone using an integral accelerometer indicate that energy usage by the accelerometer itself is generally less than about 1 mW of power. In contrast, when the processor or CPU of the phone is actually sampling the accelerometer, the overall power consumption of the phone is on the order of about 700 mW (depending, of course, on the specific phone architecture). Although the sensor itself has a very small power consumption, the need to keep the phone's main processor and associated high power components active to access the sensor reading results in an overall power consumption which is on the order of about 700 times larger than the sensor power consumption. Consequently, as mobile phone main processors continue to become more powerful and sensors become more and more energy efficient, the power consumption of the main processor will continue to dominate the total energy spent when accessing sensors.

Another obstacle to continuous sensing on current mobile phones or communications devices is that continuous or periodic sampling of one or more sensors prevents the phone from going into an idle mode wherein battery power is conserved. For example, a typical phone that was evaluated for energy usage was observed to take approximately 900 ms to move into an idle state (following a period of no activity) and approximately 270 ms to exit from the idle state (once activity is detected). As a result, a full transition between the phone's idle and active states takes more than one second. This implies that, even at a relatively low sampling frequency of 1 Hz, continuous sampling of sensors (such as accelerometers) will prevent the phone from entering the low power idle state, since the phone does not have enough time to transition between idle and active states between two consecutive sensor readings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Communication Device with Energy Efficient Sensing," as described herein, provides a novel sensing architecture for mobile phones or other communications devices that reduces energy usage of such communications devices while enabling continuous operation of various sensors and components of the communications device. Examples of such mobile phones and communications devices include, but are not limited to mobile phones, smart phones, handheld communications devices, handheld computing devices, tablet-type computing devices, etc. However, such devices will generally be collectively referred to herein as "mobile phones" or "communications devices" for purposes of discussion. Examples of sensors include, but are not limited to accelerometers, ambient light sensors, compasses, microphones, pressure sensors, touch sensors, low-power radio devices, temperature sensors, gyroscopic sensors, inertial sensors, tilt sensors, etc.

In general, the Communication Device with Energy Efficient Sensing Device achieves significant reduction in energy usage by offloading sampling and, in various embodiments, processing, of sensor data received from built-in or integrated sensors to a dedicated low-power processor. This dedicated low-power processor has the capability to interact or interface with a primary processor of the communications device when necessary. This approach enables the communications device to perform periodic and/or continuous sensing with a low power overhead. In various tested embodiments of the Communication Device with Energy Efficient Sensing, it was observed that that the sensing architecture described herein can be two to three orders of magnitude more energy efficient in comparison to conventional communications devices operating with the same or similar sensors.

More specifically, in the Communication Device with Energy Efficient Sensing, various low-power analog and digital sensors are attached to a low-power processor. The low-power processor is typically a low-power microcontroller that consists of a CPU, RAM, ROM, and various peripherals such as serial communication buses or other communications mechanisms or data channels. The low-power processor is interfaced to the primary processor of the mobile phone using a serial bus (or other communications channel or type) and multiple control signals. The microcontroller having the low-power processor can be implemented either as a separate chip or as a separate low-power core within the main or primary processor of the mobile phone.

The architecture of the Communication Device with Energy Efficient Sensing provides a fully programmable approach to deciding when to wake the main processor based on the readings of one or more of the sensors attached to the low-power processor. Since the low-power processor is a programmable general purpose processor, this decision making can be customized to meet the demands of the current user and the set of applications running on the mobile phone. If some of these decision making algorithms needs to be changed, the low power processor can be reprogrammed on the fly to reflect these changes. Because the low-power processor has access to concurrent readings from multiple sensors, the Communication Device with Energy Efficient Sensing is capable of much richer context aware decision making.

Note that treat the terms "processor" and "CPU" are used interchangeably throughout this document, and that the term "microcontroller" is used herein to refer to a device with a CPU and other hardware resources, such as memory, ND converters, etc.

In view of the above summary, it is clear that the Communication Device with Energy Efficient Sensing described herein provides various techniques for enabling a variety of sensor-based applications and processes while conserving energy on mobile communications devices. In addition to the just described benefits, other advantages of the Communication Device with Energy Efficient Sensing will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
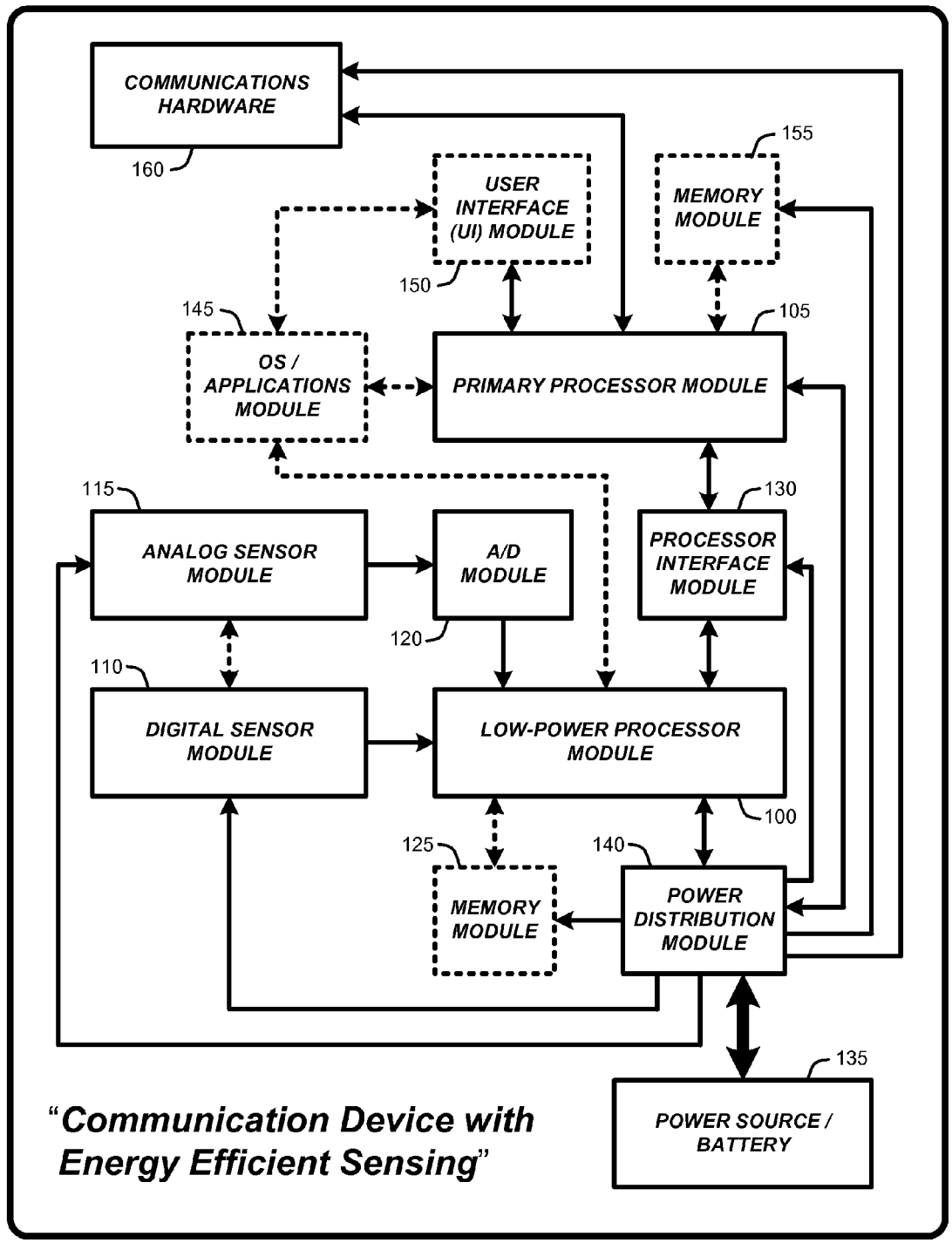
FIG. 1 provides a general architectural diagram that illustrates hardware and software modules for improving energy efficiency of continuous sensing applications in a "Communication Device with Energy Efficient Sensing," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, a "Communication Device with Energy Efficient Sensing," as described herein, provides various techniques for enabling a variety of sensor-based applications and processes while conserving energy on mobile communications devices. Energy conservation is achieved by use of a low-power processor of the communications device that is used for sensor-related input and tasks. Tasks not capable of being performed by the low-power processor are passed to a primary processor of the communications device that remains in an idle state, sleep mode, or "off" condition until needed, thereby providing a significant power savings.

In other words, the Communication Device with Energy Efficient Sensing provides a novel sensing architecture for mobile phones or other communications devices that reduces energy usage of such communications devices while enabling continuous operation of various sensors and components of the communications device. Examples of such mobile phones and communications devices include, but are not limited to mobile phones, smart phones, handheld communications devices, handheld computers, tablet-type computing devices, etc. However, such devices will generally be collectively referred to herein as "mobile phones" or "communications devices" for purposes of discussion. Examples of sensors include, but are not limited to accelerometers, ambient light sensors, compasses, microphones, pressure sensors, touch sensors, low-power radio devices, temperature sensors, gyroscopic sensors, tilt sensors, etc.

Note that treat the terms "processor" and "CPU" are used interchangeably throughout this document, and that the term "microcontroller" is used herein to refer to a device with a CPU or processor and other hardware resources, such as memory, ND converters, etc.

To enable energy efficient continuous sampling on phones, the Communication Device with Energy Efficient Sensing offloads sensor sampling and processing onto the low-power processor. By decoupling the main or primary processor of the mobile phone from the sensors, this architecture enables most parts of the phone to enter a low power state, while the low-power processor is periodically and/or continuously sampling and processing sensor data at a low power overhead.

More specifically, the Communication Device with Energy Efficient Sensing includes a low-power processor-based hardware architecture and a software stack that can be added to any conventional mobile phone architecture to enable the energy saving features described herein. In particular, a low-power processor or a processor core is added to the phone hardware and the phone's sensors are connected to this processor. This low-power processor handles the reading and low-level processing of sensor data. The software stack, split between the OS layer of the main or primary processor and the low-power processor provides software features or routines such as: call backs, configurable processing and buffering elements, and efficient sharing of sensor data among applications. However, it should be clear that a wide variety of features, routines, programs, etc., can be included in the software stack to address the particular requirements of specific users or devices.

Note that the low-power processor can be integrated with the primary processor within a multi-core CPU, though these processors can also be separate components, if desired. However, it is anticipated that additional energy savings can be achieved by using separate low-power and primary processors to construct the Communication Device with Energy Efficient Sensing since multi-core processors containing both the low-power and primary processors would require selective core idle or sleep modes that would tend to complicate the overall design. Further, in the case of separate processors, either or both the primary and low-power processors may include single core or multi-core embodiments. However, for purposes of explanation, the primary and low-power processors will be discussed herein as single-core implementations. The natural extension to multi-core processors for either or both the primary and low-power processors should be understood by those skilled in the art.

Note also that in various embodiments, one or more sensors of the Communication Device with Energy Efficient Sensing can be associated with (i.e., handled by) either or both the primary and low-power processors. Consequently, in various embodiments, such sensors can be switched from the primary processor to the low-power processor whenever it is desired to enter a low-power or energy saving state. Conversely, such processors can be switched from the low-power processor to the primary processor in order to provide additional computing power for particular tasks. However, in either case, it should be understood that while the Communication Device with Energy Efficient Sensing can be designed to allow either processor to directly interface with any particular sensor, maximum energy savings will generally be achieved by allowing the low-power processor to directly interface with each sensor, and then to pass any sensor information (or processed sensor results) from the low-power processor to the primary processor when necessary to perform a particular task. Further, it should be clear that the sensors can be specifically dedicated to the low-power processor without the use or implementation of the optional switching capability noted above.

1.1 System Overview:

As noted above, the "Communication Device with Energy Efficient Sensing" provides various techniques for enabling a variety of sensor-based applications and processes while conserving energy on mobile communications devices. The processes summarized above are illustrated by the general system diagram of FIG. 1. In particular, the system diagram of FIG. 1 illustrates the interrelationships between hardware and software or program modules for implementing various embodiments of the Communication Device with Energy Efficient Sensing, as described herein. Furthermore, while the system diagram of FIG. 1 illustrates a high-level view of various embodiments of the Communication Device with Energy Efficient Sensing, FIG. 1 is not intended to provide an exhaustive or complete illustration of every possible embodiment of the Communication Device with Energy Efficient Sensing as described throughout this document.

In addition, it should be noted that any boxes and interconnections between boxes that may be represented by broken or dashed lines in FIG. 1 represent alternate embodiments of the Communication Device with Energy Efficient Sensing described herein, and that any or all of these alternate embodiments, as described below, may be used in combination with other alternate embodiments that are described throughout this document.

In general, as illustrated by FIG. 1, the Communication Device with Energy Efficient Sensing generally includes a low-power processor and associated sensors, power supply and control circuitry, optional memory for storing and/or accessing sensor inputs or other data, an interface to a primary processor of a mobile phone, in combination with software, an OS, a user interface, and communications hardware typical of a mobile phone. In other words, FIG. 1 can be considered as illustrating a mobile phone having an additional low-power processor and associated sensors with various interface, power, and control electronics.

More specifically, as illustrated by FIG. 1, the Communication Device with Energy Efficient Sensing includes a low-power processor module 100 that is coupled to either or both a digital sensor module 110 including one or more digital sensors and an analog sensor module 115 including one or more analog sensors. Note that the analog sensor module 115 may also include an A/D module 120 that includes one or more ND converters to allow the low-power processor module 100 to receive digital inputs corresponding to analog sensors of the analog sensor module 115. Optionally, the ND module 120 may also be included in the low-power processor module 100 itself (not illustrated).

In various embodiments, a memory module 125 is coupled to the low-power processor module 100. In general, the memory module 125 provides either a dedicated or shared memory for the low-power processor module 100 that is also available to a primary processor module 105 of the Communication Device with Energy Efficient Sensing. In general, the primary processor module 105 includes a typical mobile phone processor that includes a user interface provided via a user interface (UI) module 150 along with various apps running on an OS of the mobile phone in addition to typical communications hardware 160 found on a typical mobile phone. The apps and OS are provided by an OS/Applications module 145. Note that depending upon the specific design and architecture of the Communication Device with Energy Efficient Sensing, the mobile phone may also include a second memory module 155 that is available to the primary processor module 105.

Communications between the low-power processor module 100 and the primary processor module 105 is provided via a processor interface module 130 that provides both data transfer and control operations that can be performed or initiated by either processor module with respect to the other. Optionally, this communication can happen through the shared memory (i.e., memory module 125 and/or memory module 155), or a combination of shared memory and the processor interface module 130. However, in general it is anticipated that the Communication Device with Energy Efficient Sensing will be designed in such a way that the low-power processor module 100 continuously or periodically samples various sensors of the mobile phone, while only providing that information to the primary processor module 105 when it becomes necessary to wake the mobile phone via the processor interface module 130.

With respect to power, the Communication Device with Energy Efficient Sensing generally simply draws power from a power source/battery 135 of the mobile phone. Power is distributed from the power source/battery 135 via a power distribution module 140. In general, the power distribution module 140 provides power to all components in the Communication Device with Energy Efficient Sensing that require power (including the A/D module 120, though this connection is not illustrated for purposes of clarity in the FIG. 1). Further, in various embodiments, the power distribution module 140 is controlled by either or both the low-power processor module 100 and the primary processor module 105. In general, control of the power distribution module 140 by the low-power processor module 100 ensures that power expenditures to various portions of the mobile phone are eliminated or set to whatever level is needed while still allowing the low-power processor to receive and/or process sensor readings.

2.0 Details of the Communication Device with Energy Efficient Sensing

The above-described program modules are employed for implementing various embodiments of the Communication Device with Energy Efficient Sensing. As summarized above, the Communication Device with Energy Efficient Sensing provides various techniques for enabling a variety of sensor-based applications and processes while conserving energy on mobile communications devices. The following sections provide a detailed discussion of the operation of various embodiments of the Communication Device with Energy Efficient Sensing, and of exemplary methods for implementing the hardware and software or program modules described in Section 1 with respect to FIG. 1. In particular, the following sections provides examples and operational details of various embodiments of the Communication Device with Energy Efficient Sensing, including: an operational overview of the Communication Device with Energy Efficient Sensing; Hardware Components of a Tested Embodiment; Enabling Low Power Operation; Software Components of a Tested Embodiment; and Exemplary Low-Power Applications.

2.1 Operational Overview:

As noted above, the Communication Device with Energy Efficient Sensing described herein provides various techniques for enabling a variety of sensor-based applications and processes while conserving energy on mobile communications devices. To enable energy efficient continuous sampling on phones, the energy saving solutions described herein offload sensor sampling and processing onto a low-power processor. By decoupling the main processor of the phone from the sensors, this architecture enables most parts of the phone to enter a low power state, while the low-power processor is periodically and/or continuously sampling and processing the sensor data at a low power overhead.

More specifically, the Communication Device with Energy Efficient Sensing provides an architecture for mobile communications devices for organizing and interacting with sensors on the communications device that enables continuous or periodic sensing with a minimal energy overhead. Energy savings are achieved by adding a small, energy efficient co-processor to the communications device, and offloading sensing tasks from the primary processor of the communications device to this small low-power processor. Some or all of the available sensors on the phone are connected to the small processor, enabling the rest of the phone to go into a "sleep" mode or other low-power state or condition, while the low-power co-processor is continuously or periodically acquiring and processing sensor data at a low energy overhead.

Since the primary processor and the low-power co-processor of the communications device are tightly integrated, data between them can be easily buffered and quickly exchanged on demand. For example, upon detecting an interesting event (such as, for example, an acceleration profile indicating a user fall), the low-power processor can wake up the primary processor to handle high-level user application related tasks. A simple example of this concept is an application that automatically calls for help, depending upon the specifics of the acceleration profile of the detected user fall, after the low-power automatically wakes the primary phone processor for purposes of initiating an emergency call.

Consequently, the Communication Device with Energy Efficient Sensing allows mobile phones and communications devices to continuously sense and update user context information, even when those devices are in a "sleep" mode, an idle state, or simply "off." Further, since user attention is not typically required for this type of low-power sensing, applications making use of these capabilities are very useful for ubiquitous computing scenarios. In addition, it is important to note that, unlike previous work, the Communication Device with Energy Efficient Sensing is an integral part of the mobile communications device and not merely a sensing-add-on for phones, which, although useful for prototyping research ideas and applications, puts an extra burden on users to carry and maintain two separate devices instead of a single device.

2.2 Hardware Components of a Tested Embodiment:

In general, the Communication Device with Energy Efficient Sensing provides a solution wherein some or all of the sensors of a mobile phone are connected to an energy efficient low-power processor which handles sampling and low-level processing of the sensor data. In a tested embodiment, the low-power processor connects to the phone's main application processor through a serial bus and several General Purpose Input Output (GPIO) lines for communication and control between these two processors. However, it should be understood that any conventional wired or wireless technique that allows communications between sensors, processors, memory, etc. of the mobile phone can be utilized to implement various embodiments of the Communication Device with Energy Efficient Sensing described herein.

The following paragraphs describe various components that were used to implement a tested embodiment of the Communication Device with Energy Efficient Sensing. However, it should be understood that the components described below are not intended to limit the Communication Device with Energy Efficient Sensing to the particular embodiments or components disclosed, and that these components are discussed only for the purpose of describing a working example of one very simple implementation of the Communication Device with Energy Efficient Sensing.

2.2.1 Low-Power Processor Module:

In a prototype tested embodiment, a low-power processor module component of the Communication Device with Energy Efficient Sensing included a low-power microcontroller implemented using an MSP430F5438 microcontroller with 16 kB RAM and 256 kB flash memory. While very low in energy usage, this microcontroller can be clocked up to 18 MHz, thus allowing a wide range of sensor-based applications. This microcontroller also has a large number of parallel and serial inputs and outputs, enabling the attachment of additional sensors other than those that are already built in to the hardware prototype. Note that in this tested embodiment, an additional small MSP430 microcontroller (MSP430F2013) was added to the low-power processor module to allow for programming of the low-power processor module through the attached primary processor of the mobile phone. Note that in this tested embodiment, a dedicated third processor was used to interface the low-power processor module to the primary processor in order to allow the primary processor to more easily program the low-power-processor module. The low-power processor module in this tested embodiment also contained an 8 MB flash storage, and a potential divider for measuring phone battery voltage. Again, it must be understood that the components described above are discussed only for purposes of explanation and that these components are not intended to limit the Communication Device with Energy Efficient Sensing to the particular devices disclosed, nor are any of the identified components specifically required in order to implement fully functional embodiments of the Communication Device with Energy Efficient Sensing.

A typical low power processor, such as a member of the MSP430 microcontroller family, has multiple hardware modules such as counters, timers, A/D converters, and serial buses that can operate concurrently. This hardware parallelism and the typical multi MHz processor clock speeds makes it possible to achieve almost real time response when sampling and processing sensor data (assuming a light-weight processing workload). As an example, using the I2C of the MSP430 processor in the tested embodiment of the Communication Device with Energy Efficient Sensing, a maximum sampling rate of 500 Hz could be easily supported by an BMA1050 accelerometer. In contrast, if sensor sampling was done on the phone's primary processor, with a full featured OS and user applications vying for processor resources, it may not be possible to guarantee real time behavior, when sampling and processing multiple sensors. In other words, since the OS doesn't run on the low-power processor, the low-power processor, in many cases, will provide improved real-time performance over the more powerful primary processor of the mobile phone.

In addition, since the low-power processor and associated sensors are independently powered from a dedicated power supply derived from phone's battery, the Communication Device with Energy Efficient Sensing enables sensing and low-level processing to continue irrespective of the status of the main phone processor (e.g., on, off, idle, sleep, standby, etc.). Further, in the tested embodiment of the Communication Device with Energy Efficient Sensing, the Communication Device with Energy Efficient Sensing can command otherwise initiate a wake up or a power up of the phone's primary processor on demand (or in response to particular sensor outputs). This makes it possible to build critical applications, such as an application that automatically contacts a remote authority upon detecting a medical or a physical emergency (such as the accelerometer-based fall detection noted above), using the sensing architecture of the Communication Device with Energy Efficient Sensing, even when the phone is turned "off" (except for the low-power components associated with the phone sensors).

2.2.2 Digital Sensor Module:

The prototype tested embodiment of the Communication Device with Energy Efficient Sensing included both digital and analog sensors. The digital sensors are embodied in a digital sensor module that contains a temperature sensor, a 3-axis accelerometer, a barometer, and a 3-axis compass module connected to the main processor by an I2C bus. Again, it should be clear that any desired type of communications bus or technique between sensors, processors and of the components of the Communication Device with Energy Efficient Sensing may be used without departing from the intended scope of the of the Communication Device with Energy Efficient Sensing, as described herein. These aforementioned sensors in the prototype tested embodiment of the Communication Device with Energy Efficient Sensing are powered from a separate voltage regulator to reduce the impact due to digital switching noise from the processor. Again, it must be understood that the components described above, and any particular means of connection or interaction with the low-power processor are discussed only for purposes of explanation and that these components are not intended to limit the Communication Device with Energy Efficient Sensing to the particular devices disclosed.

2.2.3 Analog Sensor Module:

As noted above, the prototype tested embodiment of the Communication Device with Energy Efficient Sensing included both digital and analog sensors. The analog sensors are embodied in an analog sensor module that contains a variety of sensors that have analog outputs. For example, in this tested embodiment, this analog sensor module contained an X-Y axis gyroscope and a Z axis gyroscope that collectively provide 3-axis gyroscopic data. To reduce the impact due to processor generated digital noise, and to provide improved resolution over what is possible with the built in ND converter of the processor, external 16 bit ND converters were used to digitize the gyroscope outputs. To enable concurrent sampling of all 3 Gyroscope channels and to minimize the data acquisition delay, 3 separate A/D converts are used, one for each axis. Again, it must be understood that the components described above are discussed only for purposes of explanation and that these components are not intended to limit the Communication Device with Energy Efficient Sensing to the particular devices disclosed.

2.2.4 Phone Interface:

In the prototype tested embodiment of the Communication Device with Energy Efficient Sensing, the low-power processor module and attached digital and analog sensor modules were connected to the primary processor of the mobile phone via an expansion connector. In this tested embodiment, the phone communicates with the low-power processor and attached sensors using an SPI (Serial Peripheral Interface) bus at communication speeds up to 1 Mb/s. Again, it should be clear that any desired type of communications bus or technique between sensors, processors and any of the components of the Communication Device with Energy Efficient Sensing may be used without departing from the intended scope of the Communication Device with Energy Efficient Sensing, as described herein.

Each of the aforementioned modules of the tested embodiment was directly powered from the phone's battery, though a separate power source could be used for this purpose, if desired. In this prototype tested embodiment of the Communication Device with Energy Efficient Sensing, the low-power processor had the capability to turn the phone (i.e., the primary processor and associated hardware) on and off and to monitor the state of the phone (active vs. idle) using various pins of the expansion connector. Further, in this tested embodiment, one of the pins on this connector was used to enable the primary processor of the mobile phone to reset the low-power processor coupled to the sensors. Another pin of the expansion connector was used to allow the low-power processor to wake up the phone from an idle or sleep state and to interrupt the phone when phone's immediate attention was required, depending upon specific application parameters relating to various sensor readings received by the low-power processor. Again, it must be understood that the above-described connections of the interface between the low-power and primary processors are provided only for purposes of explanation and are not intended to limit the scope of the Communication Device with Energy Efficient Sensing to the particular types or uses of the particular connections discussed.

2.3 Enabling Low Power Operation:

In various embodiments, the low-power processor and associated sensors and electronics of the Communication Device with Energy Efficient Sensing may be continuously powered-on to enable continuous sensing. Consequently, it is useful to minimize the power consumption of the low-power processor and associated electronics in such embodiments to minimize the impact on the phone's battery life. The following paragraphs describe various optional design choices that can be used to minimize the power consumption of the Communication Device with Energy Efficient Sensing. The basic idea here is to minimize the current draw of the low-power processor and the associated sensors and electronics. Note, however, that in various embodiments, the low-power processor and associated sensors and electronics of the Communication Device with Energy Efficient Sensing can be turned off, if desired.

2.3.1 Hardware Isolation at the Phone Interface:

Providing proper isolation between the logic circuits of the Communication Device with Energy Efficient Sensing between the phone portion and the low-power processor and sensor portion of the mobile phone is useful for both eliminating excessive current as well as preventing hardware failures. As an example, any logic input to the mobile phone should be disabled as soon as the phone GPIO interfaces are turned off. Otherwise, there can be excessive currents going in to the turned off circuits on the phone, which, besides increasing power consumption, could also cause hardware damage on the phone. Therefore, to achieve almost instantaneous disabling of any logic levels applied to the phone, when the phone is turned off, this tested embodiment of the Communication Device with Energy Efficient Sensing used simple logic chips that automatically turn off these signals upon detecting the phone being turned off.

2.4 Software Components of a Tested Embodiment:

The aforementioned prototype tested embodiment of the Communication Device with Energy Efficient Sensing uses a software API that exposes the main or primary processor of the mobile phone to the low-power processor, thereby enabling communication and control operations between these processors. In this tested embodiment, the API was implemented using a software layer on the primary processor which acts as stubs that generate and receive appropriate serialized messages to and from the low-power processor. However, it should be clear that there are many ways in which communications between the primary and low-power processors of the mobile phone can be implemented. As such, the following discussion should be understood to be but one of many examples of ways in which the Communication Device with Energy Efficient Sensing can be implemented.

In general, the aforementioned API includes a kernel driver with an IO control (ioctl) interface for accessing the low-power processor and associated sensors from user applications on the mobile phone. This interface provides methods to transfer a byte array over the SPI bus, to set the GPIO pin direction, to set and read the GPIO pin value, to control interrupts on the GPIO pin, and to register GPIO interrupt event handlers.

Further, in order to provide a capability to reprogram the low-power processor of the Communication Device with Energy Efficient Sensing using the mobile phone, the tested embodiment of the Communication Device with Energy Efficient Sensing included an application on the phone that uploads a precompiled binary image onto the low-power processor over the SPI bus used to communicate between the low-power processor and the mobile phone. In this tested embodiment, a secondary MSP430 microcontroller was used to reprogram the primary MSP430 microcontroller on the Communication Device with Energy Efficient Sensing.

2.4.1 Class Hierarchy:

In the tested embodiment of the Communication Device with Energy Efficient Sensing, services available from the low-power processor, such as sensors and processing elements (e.g., low-pass filter, threshold filter, etc.) are defined by a unique resource type, which are sub classes of a parent Resource class. The Resource class has two subclasses, a Sensor class and a Task class. Various sensors in the mobile phone are represented by unique classes (e.g., an Accelerometer class representing the accelerometer) that are the children of the Sensor class. Similarly, various tasks (such as a low pass filter and a thresholding element) are children of the Task class. Note that specific phone manufacturers may derive further subclasses to represent sensors and tasks unique to them (for example, a manufacturer may derive a unique AccelemeterABC class from the generic Accelerometer class).

Each Resource may have an input and an output port table. Each port table may have a number of ports. A sensor typically includes one or more output ports, depending upon the sensor type. Each output port of the sensor represents a type of data produced by the sensor. For example, a temperature sensor has a single output port which represents the temperature, while a 3-axis accelerometer will have three output ports, one port representing each axis.

A Task has both output and input ports (at least one of each). Each input port represents a data stream coming into the Task while an output port represents the processed data stream.

2.4.2 API:

The API enables the primary processor of the Communication Device with Energy Efficient Sensing to request an instance of a Resource using method calls. Following is a simple example of method calls for implementing a simple API for enabling the Communication Device with Energy Efficient Sensing. Again, it should be understood that the following API discussion is intended only as an example of one of the many ways in which an API can be implemented to enable the Communication Device with Energy Efficient Sensing, and is not intended to limit the scope of the Communication Device with Energy Efficient Sensing described herein.

For example, in a tested embodiment of the Communication Device with Energy Efficient Sensing, the API enabled resource calls using the following exemplary framework:

Resource_Handle GetResource(Resource.Type, Resource.Params)

Resource.Type: This is the type (name) of the resource being requested (the Resource.Type is an enumeration of resource types available on a particular make of phone);

Resource.Params: Each resource type takes a set of parameters to specify its features (e.g., Sample_Rate for a Sensor Resource, Cut_Off_Frequency for a Low_Pass_Filter resource, etc.);

Resource Handle: This is a handle that uniquely identifies the Resource instance created. This also identifies the resource type it belongs to. This is NULL if the Resource was not created due to lack of resources etc.

Once resources are created, they can be connected together to form "Task graphs" with sensors as the source that connects to the inputs of Task. For example, the output port of a sensor may be connected to the input port of a threshold Task, while the output port of a threshold Task may be connected to the input port of a low pass filter Task, as illustrated by the following framework:

Result ConnectInOutPorts(In_Port, Out_Port)

In_Port: This is the input port of an already created resource;

Out_Port: This is the output port of an already created resource;

Result: SUCCESS if operation successful, ERROR if operation failed.

In practice, the above method is called using the Resource_Handle instances as follows:

Result ConnectInOutPorts (Resource_Handle1.Type.InPort[i], Resource_Handle2)

To receive processed or unprocessed data, the primary processor of the mobile phone processor registers a callback method to a sensor or task output port as follows:

Result RegisterCallback(CallBackMethod, Out_Port)

Out_Port: This is an output port that can generate data (as a raw sensor output of an already obtained sensor resource, or as an output port of a task where all the preceding task input ports are wired so that the output port can generate data).

CallBackMethod: This is a method to be called when the data is ready (for a buffer task, this is called when the buffer is full).

Result: SUCCESS if the operation is successful, ERROR—if the operation failed.

Note that this method is meant for sensor streams where each sensor generates a stream of data (periodic or event driven). If the primary processor of the mobile phone needs just one sensor sample, the following two methods are used:

SensorData GetSensorSample(Sensor.Type)

Result getSensorSampleAsync(CallBack, Sensor.Type)

The first of these two methods is a blocking method which blocks until the particular sensor data sample is ready. The second method is an asynchronous method where the callback method CallBack will be called when the sensor data sample is ready.

In general, the aforementioned "Task graph" enables a wide range of applications and activities. Task graphs can be implemented in multiple ways. For example, different tasks can be made available in a binary form inside the low power processor. The phone processor then uses the API (see preceding discussion) to instantiate the tasks and "wire" the inputs and outputs together to create a task graph. The user application then registers a callback which gets called when the particular detection event fires.

A simple example of a task graph relating to accelerometer data can be described as follows. First, an accelerometer sensor is sampled by a sampler task, with the samples being processed using an FFT (Fast Fourier Transform) task to extract frequency information from the time-based data of the accelerometer, the results of the FFT are then filtered using a high-pass filter task and thresholded via a threshold task to determine whether a particular event has occurred, such as, for example, a user fall. The "Task graph" for this scenario is illustrated as: "Accelerometer→Sampler Task→FFT Task→Filter Task→Threshold Task→Event Detection".

Another way to process the above-described Task graph is to use the low power processor to only sample and batch the accelerometer data (i.e., the sampler task with queue is instantiated in the low power processor). Then, when the queue is full, a callback is made to the application on the phone main processor (thus waking the phone from a sleep, idle, or other low-power or off state or condition). The application running on the primary processor of the phone then implements the rest of task graph (i.e., FFT Task, Filter Task, Threshold Task, and Event Detection).

Still another way to implement that accelerometer-based event detection is to write the entire task sequence as a single application that is compiled (cross compiled) into a binary that will be run on the low power processor. In this instance, the whole application now appears as a single "task" with an "event detection" callback to the application on the phone's primary processor.

2.5 Exemplary Low-Power Applications:

The following paragraphs describe some examples of how sensor data obtained when the phones are on standby mode can enable a variety of application scenarios. Note that the following list of applications is provided for exemplary purposes only, and is not intended to limit the use of the Communication Device with Energy Efficient Sensing to the list or types of applications described below.

2.5.1 Motion Status:

By continuously monitoring the accelerometer, a mobile phone can derive whether the user is driving, walking or standing still at the moment. Note that by simply reading the accelerometer on demand, it is hard to distinguish constant-speed driving vs. standing still. However, this can be overcome by periodically evaluating other sensors, such as GPS, inertial sensors, cell tower associations, etc. Even more, by associating the acceleration data with time of day, it can be determined whether the user has driven a car today. This type of contextual information can be very useful to personalize mobile search results. For example, a high rating can be given to a restaurant 5 miles away if the Communication Device with Energy Efficient Sensing infers that the user has access to a car or is currently driving, but not otherwise. Clearly, motion status can be used for any of a number of purposes.

2.5.2 Pedometer:

Detecting user steps is easy by processing the accelerometer data. However, to count the number of steps the user walked for the entire day requires the phone to collect accelerometer data even when the phone is in the sleep mode. Consequently, embodiments where the low-power processor has access to shared memory that is also accessible to the primary processor of the mobile phone enables data collected by the low-power processor to be available to the mobile phone and applications running on that phone, even where that data was collected while the main part of the phone is in a sleep, idle, or off state.

2.5.3 Sensor-Based User Interfaces:

Keeping sensors active, even when the main part of the phone is in a sleep, idle, or off state, enables touch, motion, and sound based user interfaces, where tapping, shaking, or squeezing the phone, or providing a verbal command to the phone (captured by an onboard microphone), can be used to initiate predefined actions even when the phone is in a sleep, idle, or off state or mode. One simple example of a tapping based interface, in combination with audio sensors is low-energy continuous sampling of sound using a microphone. Circular buffering of sound samples (e.g., for 30 second windows, or some other user configurable period) enable applications such as "sound post tagging" where a user taps the phone to save some valuable information that he/she has just heard. In this case, the tapping causes the low-power processor to write the current audio data to shared memory which is then made available to one or more applications on the mobile phone once the mobile phone wakes or is turned on.

Another extension to sensor-based UI's is that, in various embodiments, the phone's touch sensors, attached to the phone's screen as an input device, are kept powered on with low power consumption while the phone's main processor is sleeping. This touch sensor can then be used to detect and interpret touch events that enables implementing various touch event (pattern based) actions. For example, using a finger or stylus type device to "write" a "question mark" on the phone screen while the phone is sleeping can cause the low-power processor to turn the phone on with a search engine page as the starting page. Clearly, this is but one of many potential uses and applications that can be enabled by the use of touch-based sensors that are enabled while the phone is sleeping or in a low-power state.

2.5.4 Automatic Ring Tone Adjustment:

Another simple example of how a microphone sensor can be used for continuous sensing applications is that by continuously monitoring background noise and patterns in the vicinity of the mobile phone, the Communication Device with Energy Efficient Sensing can automatically decide what ring tone and volume setting to use without user intervention. For example, in a noisy outdoor environment, the phone can use a loud volume, but in a quite conversation environment, the phone can automatically switch to vibration mode.

2.5.5 User Localization Services:

An example of how the Communication Device with Energy Efficient Sensing can provide energy efficient continuous localization is provided below. In particular, although most mobile phones are equipped with GPS, its high power consumption and poor performance in indoor and urban environments makes GPS impractical as an always-available location source. However, with continuous sensing, various inertial sensors on the phone enable dead-reckoning based localization with GPS being used infrequently to overcome the location estimation drift. In general such localization is capable of providing relatively accurate locations of the user (or mobile device) with greatly reduced power consumption, relative to a system based entirely on GPS localization. Note that such use of GPS, or any other use of GPS discussed herein, is not intended to provide location information of any identifiable user without specific user permission.

2.5.6 Other Examples of Rich Contextual Information:

Location information, in combination with background audio can be used to identify the type of the location user is in, such as attending a meeting, working in the office, or driving a car. Continuous monitoring of level and type of user activity, the amount of sleep, and exposure to noise and environmental elements makes it possible to use the phone as a wellness sensor.

2.5.7 Low-Power Radio-Based Applications:

Low power radio transmitters and receivers (e.g., Zigbee, ANT, etc.) designed to work within a limited range, generally not exceeding a range on the order of about ten meters or so, are sufficient to exchange or transfer significant amounts of information between two or more co-located Communication Device with Energy Efficient Sensing. Note that these low power radio transmitters and receivers are also controlled and/or managed by the low power processor to help minimize power usage. Consequently, by equipping the Communication Device with Energy Efficient Sensing with low-power radio capabilities, a number of local information sharing applications are enabled. Such applications include, but are not limited to, short range communications between mobile phones, without the need to actually power the phone up from a sleep or idle state.

Another example application uses the low-power radio to receive or broadcast the identify or other social or personal information of other users in the vicinity (unless a user chooses a privacy setting that prevents the transfer or broadcast of such information). For example, a simple use of this idea is that whenever the low-power processor managing the low power radio receives an identity broadcast corresponding to a person or entity in the address book of a user's mobile phone, the low-power processor on that phone can either directly alert the user that she knows someone in the immediate vicinity of the user's mobile phone, or that low-power processor can wake the primary processor of the mobile phone for a more complex action, such as alerting the user and automatically initiating a call to the nearby known person.

A further extension to this idea is that the low power radio attached to the phone via the low power processor lets it discover and interact with other phones and devices in the neighborhood. For example, in one embodiment, the phone will detect and identify the phones of the user's nearby friends or contacts, using low energy. Then, the next time that the user actively engages the phone (i.e., brings the phone to a high-power state), the information pertaining to nearby friends and contacts around the user will be given precedence (e.g., their recent emails are brought to the top of an email list; photos shared or received from the friends or contacts will be brought to the front of a photo browser within the communications device, etc.).

3.0 Exemplary Implementation Configurations:

In general, as discussed above, there are numerous options for implementing the functionality of the Communication Device with Energy Efficient Sensing within a wide variety of communications devices and using a variety of hardware configurations. However implemented, the general premise of the Communication Device with Energy Efficient Sensing is that a low-power processor interfaces with sensors of the mobile phone in place of the primary processor of the mobile phone to reduce power expenditures. Following is a brief summary of a few of the many ways in which these concepts can be implemented within a communications device or mobile phone.

3.1 Adapt an Existing Microcontroller:

Mobile phones already use dedicated microcontrollers for implementing specific functions. One good example is a capacitive touch controller which interprets various user touch events and communicates to the main processor using a serial bus or other communications bus. One possible implementation to enable an embodiment of the Communication Device with Energy Efficient Sensing is to enhance one of these processors to provide the functionality described above with respect to the low-power processor and to attach the sensors of the phone to this processor. This can be a relatively low cost implementation option, since this requires only simple modification to existing phone platform architecture without a redesign of the entire phone.

3.2 Add a Microcontroller to a Mobile Phone:

In this option, a dedicated low-power microcontroller is added to the mobile phone to provide the functionality described above with respect to the low-power processor and attach the sensors of the phone to this microcontroller. This option increases the total number of components on the phone (i.e., additional microcontroller). Therefore, this option is likely to be a slightly more costly option then adapting existing microcontrollers, as suggested above. However, given that most low-power processors are relatively inexpensive (<$1) in typical cellphone volumes, the new application modalities enabled by the Communication Device with Energy Efficient Sensing are likely to offset this additional cost.

3.3 Add a Low-Power Core to the Mobile Phone's Primary Processor:

In this option, a low-power core is added to the phone's primary processor. In this embodiment, the added low-power core provides the functionality described above with respect to the low-power processor, while the sensors of the phone are directed to this low-power core. In this case, the low-power core will have the capability to operate independently of the primary core of the phone's primary processor, even when that primary core is in an idle or sleep mode. This is likely to be a very low cost option, since the incremental cost of adding simple, low-power core on to the phone's main processor is likely to be very small. However, this option is not likely to be the first option adopted by phone manufacturers, since this requires changes to the phone's main processor itself.

3.4 Exemplary Implementation Diagrams:

FIG. 2 through FIG. 5 illustrate simplified examples of various combinations of low-power and primary processors within the communications device for enabling a variety of sensor-based applications and processes while conserving energy on mobile communications device, as described throughout this document. It should be noted that any boxes that are represented by broken or dashed lines in FIG. 2 through FIG. 6 represent alternate embodiments of the simplified communications device, and that any or all of these alternate embodiments, as described below, may be used in combination with other alternate embodiments that are described throughout this document.

Figure 2:
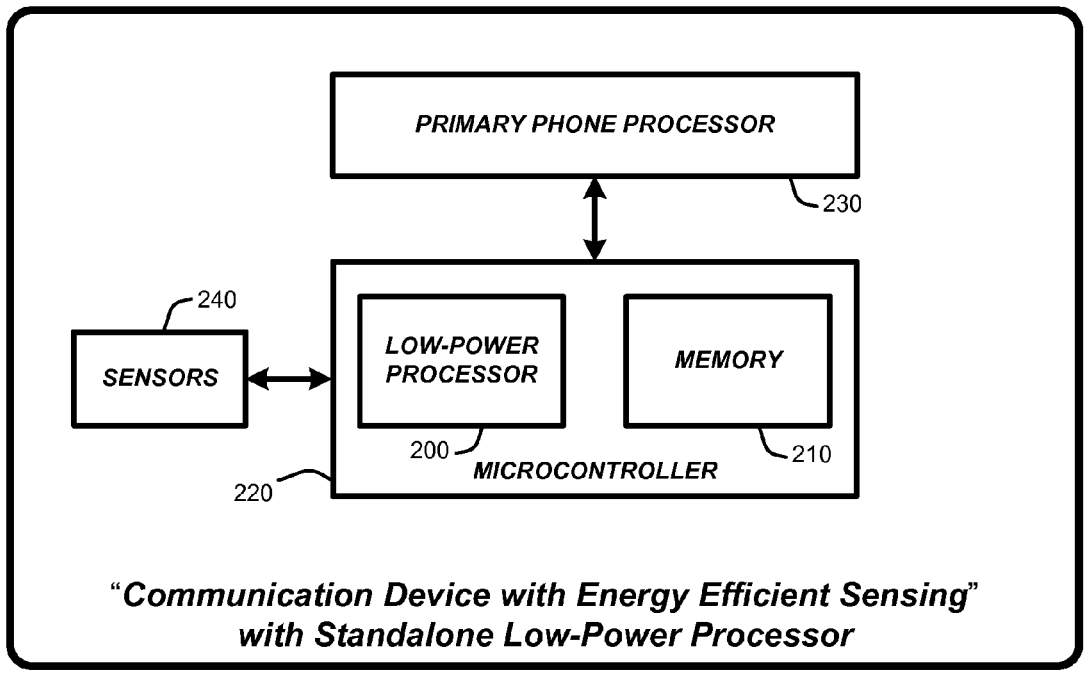
FIG. 2 illustrates an exemplary architecture of the Communication Device with Energy Efficient Sensing showing a stand-alone microcontroller connected to a primary processor of a mobile phone, for use in implementing various embodiments of the Communication Device with Energy Efficient Sensing as described herein.

For example, FIG. 2 illustrates an exemplary architecture of the Communication Device with Energy Efficient Sensing showing a stand-alone microcontroller 220 connected to a primary phone processor 230 of a mobile phone. In this embodiment, the microcontroller 220 includes a low-power processor 200 and memory 210. Sensors 240 are connected to the low-power processor 200 via the microcontroller 220.

Figure 3:
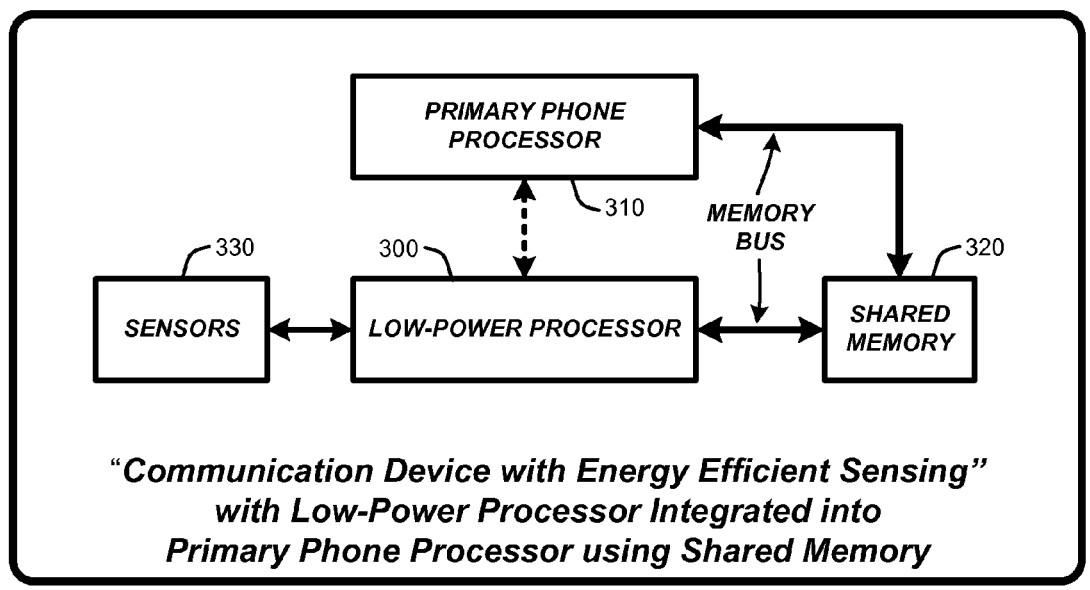
FIG. 3 illustrates an exemplary architecture of the Communication Device with Energy Efficient Sensing showing separate low-power and primary phone processors with access to shared memory, for use in implementing various embodiments of the Communication Device with Energy Efficient Sensing as described herein.

Similarly, FIG. 3 illustrates an exemplary architecture of the Communication Device with Energy Efficient Sensing showing a separate low-power processor 300 and a primary phone processor 310, both with access to shared memory 320. Sensors 330 are connected to the low-power processor 300 for use in implementing various embodiments of the Communication Device with Energy Efficient Sensing as described herein.

Figure 4:
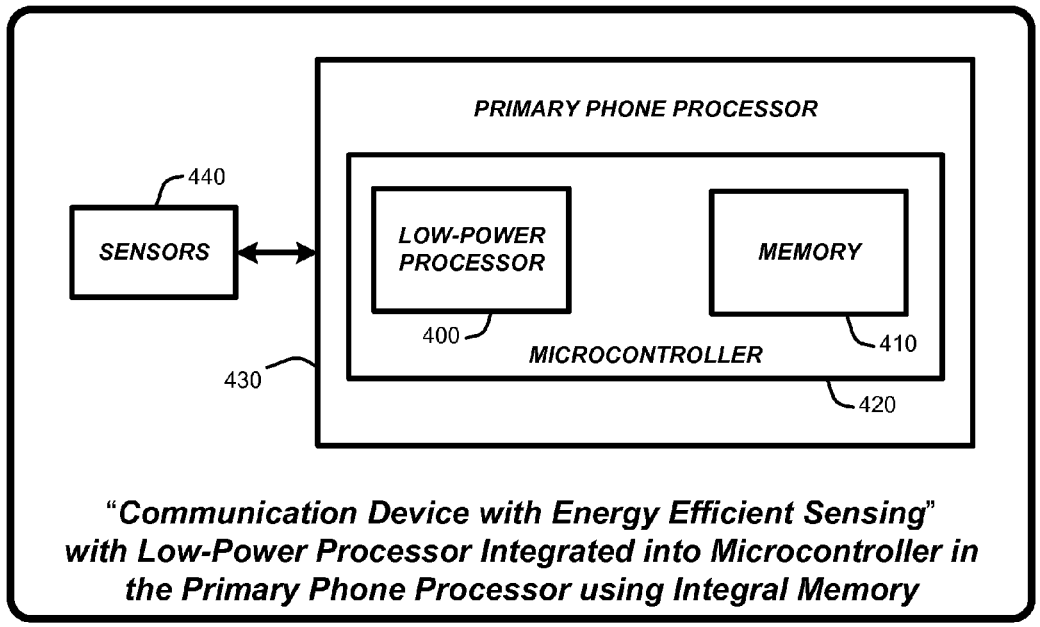
FIG. 4 illustrates an exemplary architecture of the Communication Device with Energy Efficient Sensing showing a low-power processor and memory within a microcontroller integrated into a primary phone processor, for use in implementing various embodiments of the Communication Device with Energy Efficient Sensing as described herein.

FIG. 4 illustrates an exemplary architecture of the Communication Device with Energy Efficient Sensing showing a low-power processor 400 and memory 410 integrated into a microcontroller 420 that is further integrated into a primary phone processor 430 as a separate low-power core in the primary phone processor. Sensors 440 are connected to the low-power processor 400 via the microcontroller 420.

Figure 5:
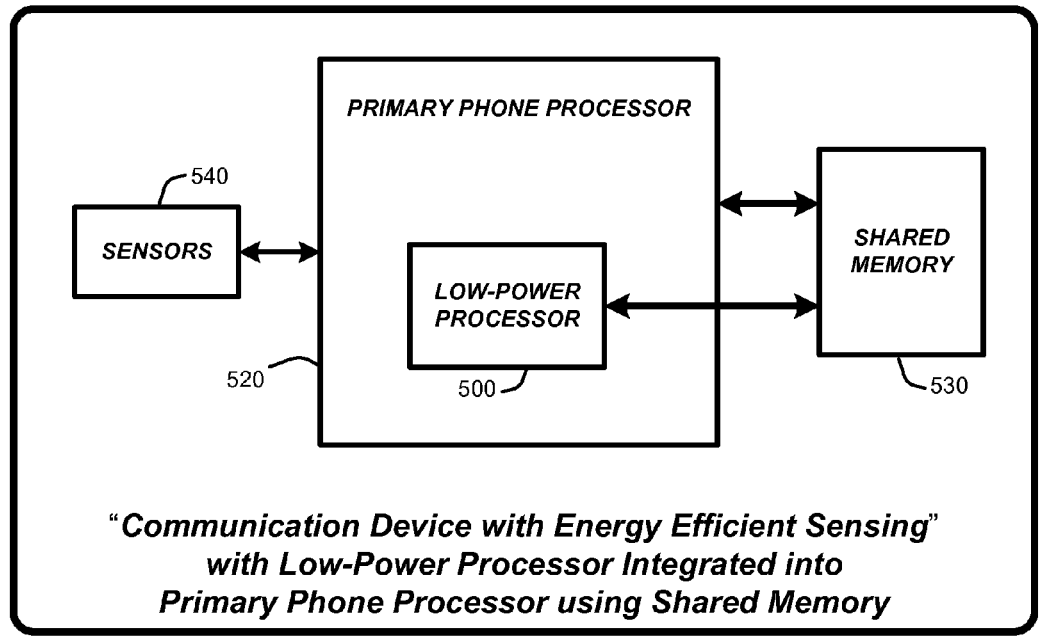
FIG. 5 illustrates an exemplary architecture of the Communication Device with Energy Efficient Sensing showing a low-power processor core integrated into a primary phone processor, wherein both processors have access to shared memory, for use in implementing various embodiments of the Communication Device with Energy Efficient Sensing, as described herein.

FIG. 5 illustrates an exemplary architecture of the Communication Device with Energy Efficient Sensing showing a low-power processor 500 integrated as a separate low-power core into a primary phone processor 520. In this example, both the primary phone processor 520 and the separate low-power processor 500 have access to shared memory 530. Sensors 540 are connected to the low-power processor 500.

Figure 6:
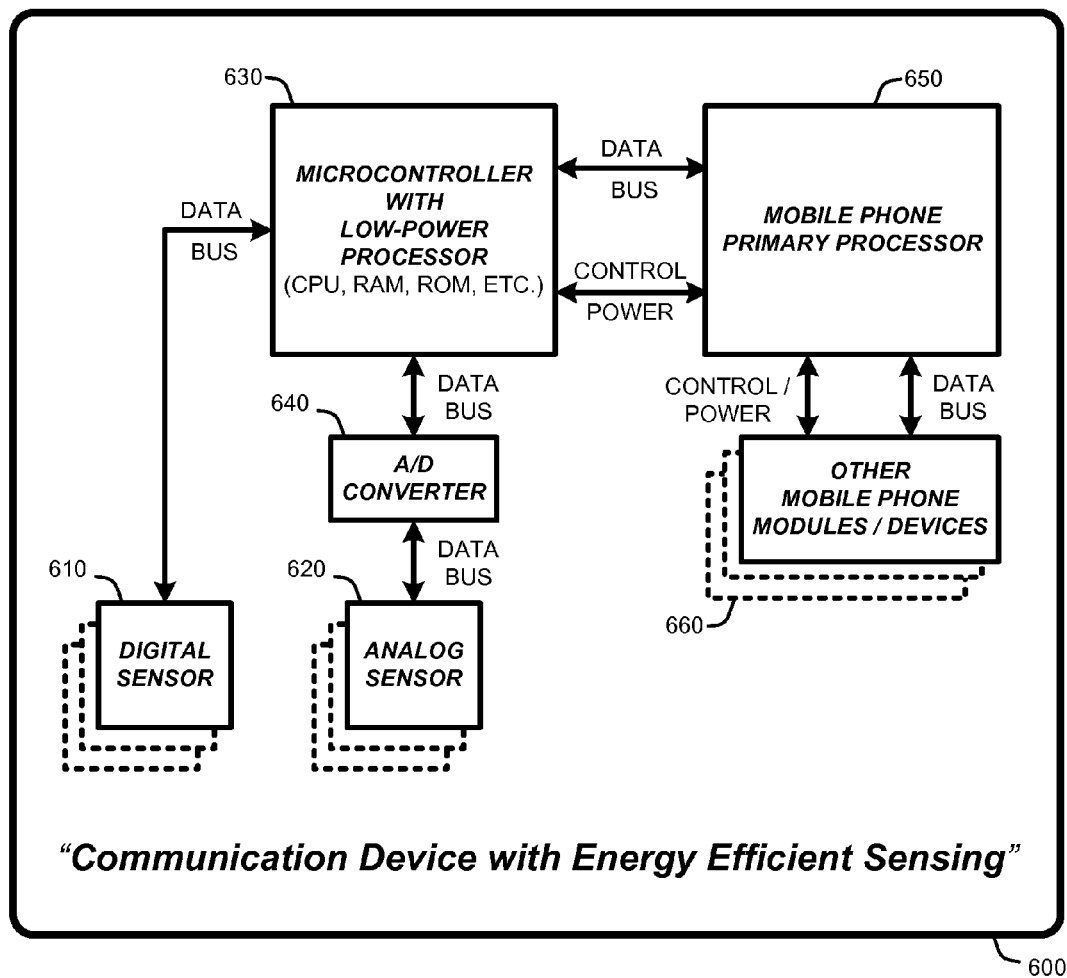
FIG. 6 illustrates a simplified architectural view of an exemplary mobile phone implemented as a Communication Device with Energy Efficient Sensing, as described herein.

FIG. 6 illustrates a simplified architectural view of an exemplary mobile phone implemented as a Communication Device with Energy Efficient Sensing, as described herein. In general, the Communication Device with Energy Efficient Sensing 600 includes conventional mobile phone functionality 605 (e.g., processors, microphones, transmitter/receiver, etc., not specifically illustrated) that is adapted to construct the Communication Device with Energy Efficient Sensing by interfacing the mobile phone functionality with the energy saving functionality described above.

More specifically, a microcontroller with a low-power processor 630 is coupled to a mobile phone primary processor 650 via conventional data busses and control lines, as illustrated. A variety of digital sensors 610 are coupled to the microcontroller with a low-power processor 630. Similarly, a variety of analog sensors 620 are coupled to the microcontroller with a low-power processor 630 via an ND converter 640 using conventional data busses, as illustrated. As discussed above, examples of sensors include, but are not limited to accelerometers, ambient light sensors, compasses, microphones, pressure sensors, touch sensors, low-power radio devices, temperature sensors, gyroscopic sensors, inertial sensors, tilt sensors, etc.

The mobile phone primary processor is coupled to a variety of devices and applications (e.g., OS, applications, microphone, user interface, speakers, touch screens, keypads, radio transmitters, etc.) that are collectively illustrated as other mobile phone modules/devices 660. Finally, note that the Communication Device with Energy Efficient Sensing 600 also includes one or more power sources and internal power distribution capability, not illustrated.

The foregoing description of the Communication Device with Energy Efficient Sensing has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Communication Device with Energy Efficient Sensing. It is intended that the scope of the invention be limited not by this detailed description, but rather by the claims appended hereto.

What is claimed is:

1. A system for conserving energy in a mobile communications device, comprising:
   a mobile communications device;
   a low-power processor integral to the mobile communications device that is coupled to a primary processor of the mobile communications device via one or more data channels;
   a plurality of sensors switchably coupled to the low-power processor and the primary processor to directly interface the sensors with either the low-power processor or the primary processor based on the switching of the sensors;
   wherein the low-power processor receives and processes inputs from one or more of the sensors via one or more data channels while the mobile communications device is in a low-power state; and wherein the low-power processor stores inputs received from the one or more sensors in a memory device that is accessible to the primary processor of the mobile communications device via one or more data channels when the mobile communications device is not in a low-power state.

2. The system of claim 1 wherein a software callback API between the low-power processor and the primary processor of the mobile communications device is used to detect programmable sensor data thresholds and conditions.

3. The system of claim 2 wherein the low-power processor initiates a transition of the primary processor of the mobile communications device to a high-power condition upon detection of one or more specific sensor data thresholds and conditions within the inputs received by the low-power processor from one or more of the sensors.

4. The system of claim 1 wherein an operating system (OS) of the mobile communications device runs on the primary processor of the mobile communications device.

5. The system of claim 1 wherein the low-power state of the mobile communications device is an "off" condition.

6. The system of claim 1 wherein the low-power state of the mobile communications device is a "sleep mode" condition.

7. The system of claim 1 wherein one or more configurable software routines for configuring buffering and processing of sensor data inside the low-power processor run on the low-power processor to control the inputs from one or more of the sensors to the low-power processor.

8. The system of claim 1 wherein one or more configurable software routines for managing efficient sharing of sensor data across applications runs on the primary processor of the mobile communications device when the mobile communications device is not in the low-power state.

9. The system of claim 1 wherein the mobile communications device includes an automated ring tone adjustment application that adjusts a current ring tone of the mobile communications device based on inputs received from a microphone sensor coupled to the low-power processor while the mobile communications device is in the low-power state.

10. A method for reducing energy usage in a mobile communications device, comprising steps for:
coupling a low-power processor to a primary processor of a mobile communications device, wherein the low-power processor continues to operate while the primary processor is in a sleep state;
switchably coupling a plurality of sensors to the low-power processor and the primary processor to directly interface the sensors with either the low-power processor or the primary processor based on the switching of the sensors;
wherein one or more of the sensors provide inputs to the low-power processor while the primary processor is in the sleep state; and
wherein the low-power processor stores the inputs received from the one or more sensors in a memory device that is accessible to the primary processor and one or more applications running on an operating system (OS) layer running on the primary processor when the primary processor of the mobile communications device is not in a sleep state.

11. The method of claim 10 further comprising steps for implementing a software stack, split between the OS layer running on the primary processor and the low-power processor to provide software features including: call backs, configurable processing and buffering elements, and efficient sharing of sensor data among applications.

12. The method of claim 10 further comprising steps for implementing a software callback API between the low-power processor and the primary processor of the mobile communications device for detecting programmable sensor data thresholds and conditions.

13. The method of claim 12 further comprising steps for using the low-power processor to initiate a transition of the primary processor to a wake state upon detection of one or more specific sensor data thresholds and conditions.

14. The method of claim 10 further comprising steps for implementing one or more configurable software routines for configurable buffering and processing of sensor data inside the low-power processor to control handling of the inputs from the one or more sensors.

15. The method of claim 10 further comprising steps for implementing one or more configurable software routines for managing efficient sharing of sensor data across applications runs on the primary processor when the mobile communications device is in a wake state.

16. A mobile phone having reduced energy usage during continuous sensing operations, comprising:
a low-power processor coupled to a primary processor of the mobile phone via one or more data channels;
a plurality of sensors switchably coupled to the low-power processor and the primary processor to directly interface the sensors with either the low-power processor or the primary processor based on the switching of the sensors;
power control circuitry coupled to the first and second power supplies and electronic components of the mobile phone for placing the primary processor into a low-power state while allowing the low-power processor to receive inputs from one or more of the sensors; and
wherein the low-power processor stores inputs received from the one or more sensors to a memory device that is accessible to the primary processor when the mobile phone is in a wake state.

17. The mobile phone of claim 16 wherein a software callback API between the low-power processor and the primary processor is used to detect programmable sensor data thresholds and conditions.

18. The mobile phone of claim 16 wherein the low-power processor initiates a transition of the primary processor to a wake state upon detection by the low-power processor of one or more specific sensor data thresholds and conditions.

19. The mobile phone of claim 16 wherein an operating system (OS) layer runs on the primary processor of the mobile phone when the mobile phone is in a wake state.

20. The mobile phone of claim 16 further comprising a software stack, split between the OS layer running on the primary processor and the low-power processor to provide software features including: call backs, configurable processing and buffering elements, and efficient sharing of sensor data among applications.

\* \* \* \* \*